United States Patent [19]
Katoh et al.

[11] Patent Number: 5,990,186
[45] Date of Patent: Nov. 23, 1999

[54] POLYURETHANE FOAM FOR SEALANT

[75] Inventors: Kenichi Katoh; Tadashi Yano; Tadao Yasue; Masahiro Ito; Tadashi Shimizu, all of Aichi, Japan

[73] Assignee: Inoac Corporation, Aichi, Japan

[21] Appl. No.: 08/810,080

[22] Filed: Mar. 4, 1997

[30] Foreign Application Priority Data

Mar. 4, 1996 [JP] Japan ..................... 8-075187

[51] Int. Cl.$^6$ .................... C08G 18/32
[52] U.S. Cl. ............ 521/128; 521/129; 521/172; 521/173
[58] Field of Search ............... 521/128, 129, 521/172, 173

[56] References Cited

U.S. PATENT DOCUMENTS

| | | |
|---|---|---|
| 4,146,687 | 3/1979 | Reale . |
| 4,156,759 | 5/1979 | Hostettler ................... 521/102 |
| 4,226,947 | 10/1980 | Yukuta et al. . |
| 4,242,463 | 12/1980 | Sanok et al. . |
| 5,077,321 | 12/1991 | Michaelis et al. . |

FOREIGN PATENT DOCUMENTS

| | | |
|---|---|---|
| 0399142 | 11/1990 | European Pat. Off. . |
| 0574651 | 12/1993 | European Pat. Off. . |

*Primary Examiner*—Morton Foelak
*Attorney, Agent, or Firm*—Sughrue, Mion, Zinn, Macpeak & Seas, PLLC

[57] ABSTRACT

A polyurethane foam for a sealant is disclosed which is produced from a composition prepared by compounding reaction mixture comprising a polyisocyanate ingredient and a polyol ingredient with a given amount by weight of an ozone inhibitor ingredient. A sealant of a predetermined shape is obtained from the foam. The polyol ingredient may be one ordinarily used for producing soft polyurethane foams, but especially preferably comprises a polyester-polyether polyol having both an ester segment and an ether segment in the molecular chain. The foam has excellent resistance to ozone deterioration and hence retains a sufficient air permeability required of a sealant for practical use. Further, the foam suffers little decrease in tensile strength from the initial value because it also has excellent resistance to deterioration by moisture and heat, i.e., high hydrolytic stability. A door for a conditioner is also described which comprises a substrate having provided on at least one surface thereof a sealant layer which comprises the polyurethane foam for sealant.

19 Claims, 5 Drawing Sheets

FIG. 1

- ● ; POLYESTER POLYOL (COMPARATIVE EXAMPLE 1)
- ▲ ; POLYETHER POLYOL (COMPARATIVE EXAMPLE 2)
- ■ ; POLYESTER-POLYETHER POLYOL (COMPARATIVE EXAMPLE 3)
- ○ ; POLYESTER-POLYETHER POLYOL + 1 PT. WT. AROMATIC AMINE (EXAMPLE 1)
- △ ; POLYESTER-POLYETHER POLYOL + 5 PTS. WT. AROMATIC AMINE (EXAMPLE 2)
- □ ; POLYESTER-POLYETHER POLYOL + 10 PTS. WT. AROMATIC AMINE (EXAMPLE 3)
- ◇ ; POLYESTER-POLYETHER POLYOL + 15 PTS. WT. AROMATIC AMINE (EXAMPLE 4)

FIG. 6

POLYURETHANE FOAM FOR SEALANT

FIELD OF THE INVENTION

The present invention relates to a high-capacity polyurethane foam for a sealant (hereinafter referred to as "sealing foam") which has excellent resistance to ozone deterioration, retains an air permeability sufficient for practical use even after long-term exposure to ozone, and suffers little decrease in mechanical strength through long-term exposure to a high-temperature high-humidity atmosphere, and a door for a conditioner using, as a sealant, the sealing foam. The sealing foam of the present invention is usable as a sealant for doors for conditioners for use in cars, etc., a toner sealant for various printers, facsimile telegraphs, copiers, etc., and the like.

BACKGROUND OF THE INVENTION

Toner sealants are used, for example, for the sealing of the toner hoppers of laser printers, copiers, and the like. The ink toner hoppers are sealed with the toner sealants so as to prevent the extraleakage of the toner, which is a fine powder. Air sealants are used, for example, in doors for conditioners provided in various automotive air ducts. These air sealants function to seal the air flow selector valves disposed in ducts for introducing air conditioned with respect to temperature, humidity, etc. into the cabin for the purpose of ventilation and air conditioning.

Polyurethane foams produced using a polyester polyol as a raw material (hereinafter referred to as "ester foams") are soft and have low air permeability, reduced permanent compression set, and excellent durability. Due to such advantages, these polyurethane foams have conventionally been frequently used as various sealants. For use in applications such as those shown above, sealants are required to also have excellent resistance to ozone deterioration. The ester foams are exceedingly superior in this point to polyurethane foams produced using a polyether polyol as a raw material (hereinafter referred to as "ether foams").

However, even the ester foams, when used as either toner sealants or air sealants, have a problem that the foams suffer cell wall breakage and a considerable increase in air permeability during long-term exposure to ozone contained in a slight amount in the atmosphere and, as a result, come to malfunction as sealants. The ester foams have another problem that they deteriorate as a result of the hydrolysis of ester bonds, which are attributable to the polyester polyol used as a major raw material.

The ester foams or the ether foams have hitherto been used as sealants for doors for automotive conditioners. Although the ester foams have excellent sealing ability at the initial stage, the foams deteriorate as a result of their hydrolysis in several years when they are used under the practical circumstances. In some serious cases, the foams break down into powders by touching them. As a result, the sealing ability of the foam remarkably decreases. For coping with the problem due to the hydrolysis, the ether foams started to be used in recent years. Although it has been confirmed that the ether foams have a life at least three times longer than that of the ester foams because the ether foams have reduced susceptibility to hydrolysis, the ether foams have another problem that they tend to cause ozone deterioration as compared with the ester foams.

Recently, air sealants for use in the doors for automotive conditioners are frequently required to have long-term durability for, e.g., 10-year warranty, because of the supposed severe environment in which the sealants will be used. Accordingly, the problems of the hydrolysis of the ester foams and the ozone deterioration of the ether foams become more serious.

In recent years, size reduction in toner particles for use in copiers and the like is progressing with the trend toward finer and color images. Because of this, strongly acidic or alkaline resins have come to be frequently used as resin ingredients for preparing colorant-containing toners, in place of conventionally employed neutral resins. As a result of this resin pH change, the hydrolysis of ester foams has come to be accelerated, and there are an increasing number of cases where ester foams come to malfunction as sealants in relatively short time periods.

SUMMARY OF THE INVENTION

The present invention has eliminated the above-described problems by incorporating an appropriate amount of an ozone inhibitor ingredient such as a specific amine additive, etc., to raw materials for sealing foam. Accordingly, an object of the present invention is to provide a high-capacity sealing foam reduced in both ozone deterioration (in the present invention, the degree of ozone deterioration is evaluated based on air permeability after exposure to ozone) and hydrolysis (in the present invention, susceptibility to hydrolysis is evaluated based on the retention of tensile strength after exposure to a wet heat atmosphere; hereinafter reduced susceptibility to hydrolysis is sometimes referred to as resistance to wet heat aging), and a door for a conditioner using the sealing foam.

Another object of the present invention is to provide a sealing foam having the same excellent capacity by using a polyol ingredient comprising a specific polyester-polyether polyol or comprising a combination of the polyol and a regular polyester polyol or polyether polyol and by further incorporating the ozone inhibitor ingredient such as the specific amine compound, etc., and a door for a conditioner using the sealing foam.

The present invention provides a polyurethane foam for a sealant obtained by reacting and curing a foamable composition comprising a polyisocyanate ingredient, a polyol ingredient, and an ozone inhibitor ingredient, the amount of said ozone inhibitor ingredient being from 1 to 25 parts by weight per 100 parts by weight of said polyol ingredient. In the present invention, an aromatic secondary amine compound is preferably used as the ozone inhibitor ingredient.

Explanation of Symbols

1: a door for a conditioner, 11: a rotary shaft, 12: a substrate, 13: a sealant layer, 2: an automotive conditioner, 3: a blower unit, 4: a cooler unit, 5: a heater unit, 6: a blower case, 7: a fan, 8: a blower motor, 9: an inside air/open air swiching box, 10: an inside air introduction port, 11: an open air introduction port, 12': an inside air/open air switching door, 13': a heat exchanger for a cooler, 14: a cooler case, 15: a heat exchanger for a heater, 16: a heater case, 17: an air mixing door, 18, 19 and 20: doors for switching an air plenum, 21: piping for hot water, 22, 23 and 24: air plenums, and 25: a by-pass

DETAILED DESCRIPTION OF THE INVENTION

Polyisocyanates generally used for producing soft polyurethane foams can be used as the "polyisocyanate ingredient" without particular limitations. Examples thereof include TDI, MDI, TDI/MDI mixtures, and modified MDIs and TDIs.

Polyols generally used for producing soft polyurethane foams can be used as the "polyol ingredient" without particular limitations. Examples thereof include polyester polyols, polyether polyols, polycarbonate polyols, and polydiene polyols. These polyols may be used either alone or in combination of two or more thereof.

The polyol ingredient used is not particularly limited in its kind as stated above. However, the "sealing foam" obtained according to the present invention should be inhibited from undergoing ozone deterioration and hydrolysis. It is therefore preferred to use a combination of a polyester polyol, which gives a foam having excellent resistance to ozone deterioration but poor resistance to wet heat aging, and a polyether polyol, which gives a foam undergoing no hydrolysis but having poor resistance to ozone deterioration. Although the proportion of a polyester polyol to a polyether polyol is not particularly limited, it is preferred to use a polyether polyol in an amount of from 70 to 90 parts by weight per 100 parts by weight of the whole polyol ingredient.

A preferred polyol is a "polyester-polyether polyol" as in a preferred embodiment of the present invention. Since this polyol has an ester segment and an ether segment in the molecule, foams obtained using the same have far higher resistance to ozone deterioration than ether foams. Further, the foams obtained with the polyol have improved resistance to wet heat aging which is almost equal to that of ether foams.

However, use of only a polyester-polyether polyol as the polyol ingredient is insufficient especially for resistance to ozone deterioration. An ozone inhibitor ingredient such as an aromatic secondary amine compound, etc. is hence incorporated in a specific amount into the foamable composition in the present invention. As a result, a sealing foam which combines excellent resistance to ozone deterioration and excellent resistance to wet heat aging can be obtained even without particularly using a polyester polyol or polyether polyol in combination with the polyester-polyether polyol.

In the case where a combination of a polyester-polyether polyol and a polyester polyol is used as the polyol ingredient, the amount of the polyester polyol is desirably from 15 to 60 parts by weight, preferably from 20 to 50 parts by weight, per 100 parts by weight of the whole polyol ingredient. In the case of using a combination of a polyester-polyether polyol and a polyether polyol, the amount of the polyether polyol is desirably from 50 to 80 parts by weight, preferably from 60 to 75 parts by weight, per 100 parts by weight of the whole polyol ingredient.

In the case where these three polyols are used in combination, the amounts of the polyester polyol, the polyester-polyether polyol, and the polyether polyol are desirably about from 5 to 45 parts by weight, about from 25 to 45 parts by weight, and about from 10 to 70 parts by weight, respectively, per 100 parts by weight of the whole polyol ingredient. In this case, the polyether polyol is preferably incorporated in a larger amount than the polyester polyol. In determining the proportions of polyols, it is necessary to take account of the fact that many commercial polyester-polyether polyol products are provided as mixtures with a polyether polyol.

It is particularly preferred to use, as the "ozone inhibitor ingredient", an aromatic secondary amine compound. Examples of the aromatic secondary amine compound (hereinafter referred to as secondary amine compound) include phenyl-1-naphthylamine, alkylated diphenylamines, N,N'-diphenyl-p-phenylenediamine, p-(p-toluenesulfonylamido)-diphenylamine, 4,4'-($\alpha$,$\alpha$-dimethylbenzyl)diphenylamine, mixed diallyl-p-phenylenediamines, and octyl-substituted diphenylamines. Also usable are amine-ketone compounds such as poly(2,2,4-trimethyl-1,2-dihydroquinoline) and 6-ethoxy-1,2-dihydro-2,2,4-trimethylquinoline.

Although these secondary amine compounds are being used as, e.g., antioxidants for rubbers, it has not been known that these compounds function to inhibit polyurethane foams from undergoing ozone deterioration and hydrolysis. For use in applications such as antioxidants for rubbers, the incorporation amount of these secondary amine compounds is usually from hundreds to thousands of ppm, specifically up to about 5,000 ppm, of the rubber.

On the other hand, in the present invention, the secondary amine compound is incorporated in a large amount of from 1 part by weight to 25 parts by weight, desirably at least 3 parts by weight, preferably at least 5 parts by weight, per 100 parts by weight of the polyol ingredient. Namely, the incorporation amount thereof based on the foam is 7,000 ppm or larger. As described above, not only those functions and effects of secondary amine compounds have been unknown, but also these compounds are used in a far larger amount in the present invention than in conventional regular formulations.

The secondary amine compounds enumerated above may be used either alone or in combination of two or more thereof. If the incorporation amount of the secondary amine compound is smaller than 1 part by weight, resistance to ozone deterioration and resistance to wet heat aging are not improved to a level sufficient for practical use. If the incorporation amount thereof exceeds 25 parts by weight, the resulting foamable composition is difficult to react and cure, making it impossible to obtain a normal foam.

The incorporation amount of the secondary amine compound is preferably from 3 to 12 parts by weight. A foamable composition in which the amount of the secondary amine compound is within the above range gives a sealing foam which has capacities sufficient for practical use, that is, which has an air permeability as measured in accordance with JIS L 1096 of from 5 to 20 $cc/cm^2/sec$ after being subjected to 400-hour exposure according to the ozone deterioration test as provided for in JIS K 6301 (region [A] in FIG. 3 corresponds to this incorporation amount range and this air permeability range). The above foamable composition can be easily reacted and cured without posing any problem in operation.

Figure 3:
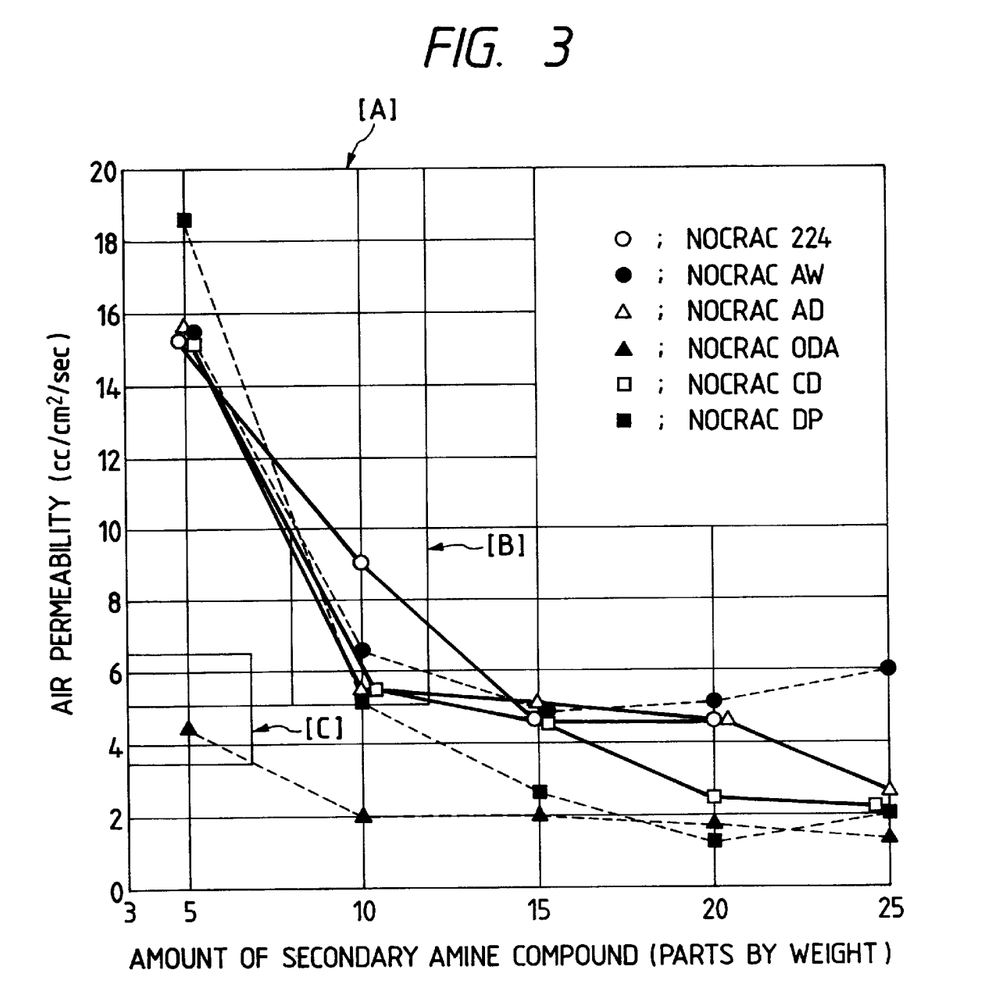
FIG. 3 shows the relationships between the incorporation amount of various secondary amine compounds and air permeability after 400-hour ozone exposure. In this figure are shown specific regions [A], [B], and [C] each representing the relationship between the corresponding amounts of the secondary amine compounds and air permeability.

In the case where the secondary amine compound is incorporated in an amount of from 8 to 12 parts by weight, the resulting foamable composition not only can be easily reacted and cured like the above composition, but also gives a high-capacity sealing polyurethane foam which has an air permeability after exposure to ozone of from 5 to 10 cc/cm$^2$/sec (region [B] in FIG. 3 corresponds to this incorporation amount range and this air permeability range). In the case of using some kinds of secondary amine compounds, a sealing foam having exceedingly high capacities can be obtained which has an air permeability after exposure to ozone of from 3.5 to 6.5 cc/cm$^2$/sec even when the incorporation amount thereof is as small as from 3 to 7 parts by weight (region [C] in FIG. 3 corresponds to this incorporation amount range and this air permeability range). A foamable composition containing the secondary amine compound in such a small amount is especially preferred in that this composition can be more easily reacted and cured.

The sealing foam of the present invention usually has a retention of tensile strength as measured in accordance with JIS K 6301 of 70% or higher after being subjected to 1,600-hour exposure to an atmosphere conditioned so as to have a temperature of 80° C. and a relative humidity of 95%. This excellent resistance to wet heat aging is achieved also with a polyol other than polyester-polyether polyols, which are highly effective in improving the above capacity.

The door for conditioner of the present invention comprises a substrate having provided on at least one surface thereof a sealant layer, wherein the sealant layer comprises the sealing foam of the present invention. The sealant layer may be provided on one surface of the substrate, but usually on both the front and back surfaces of the substrate.

Figure 4:
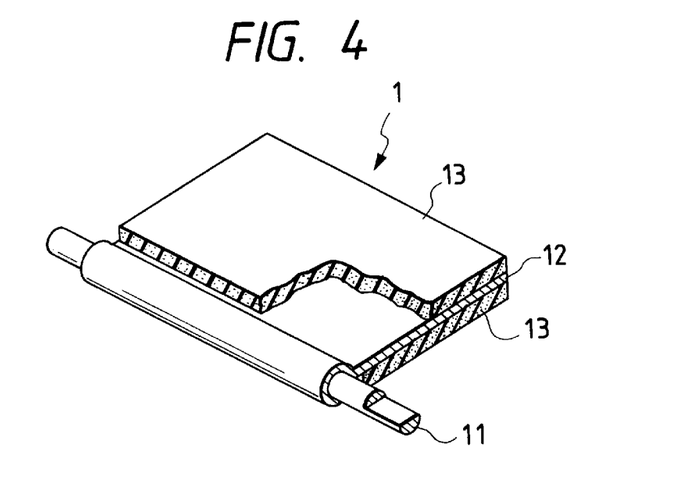
FIG. 4 is a perspective view showing a door for a conditioner.
Figure 5:
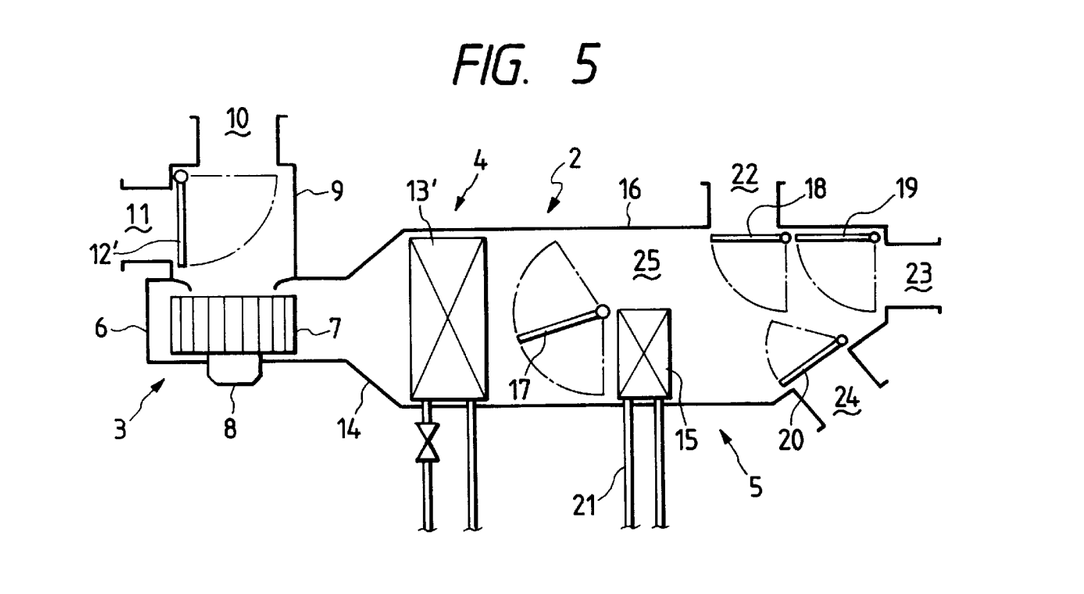
FIG. 5 is a cross-sectional diagram showing an automotive conditioner.
Figure 6:
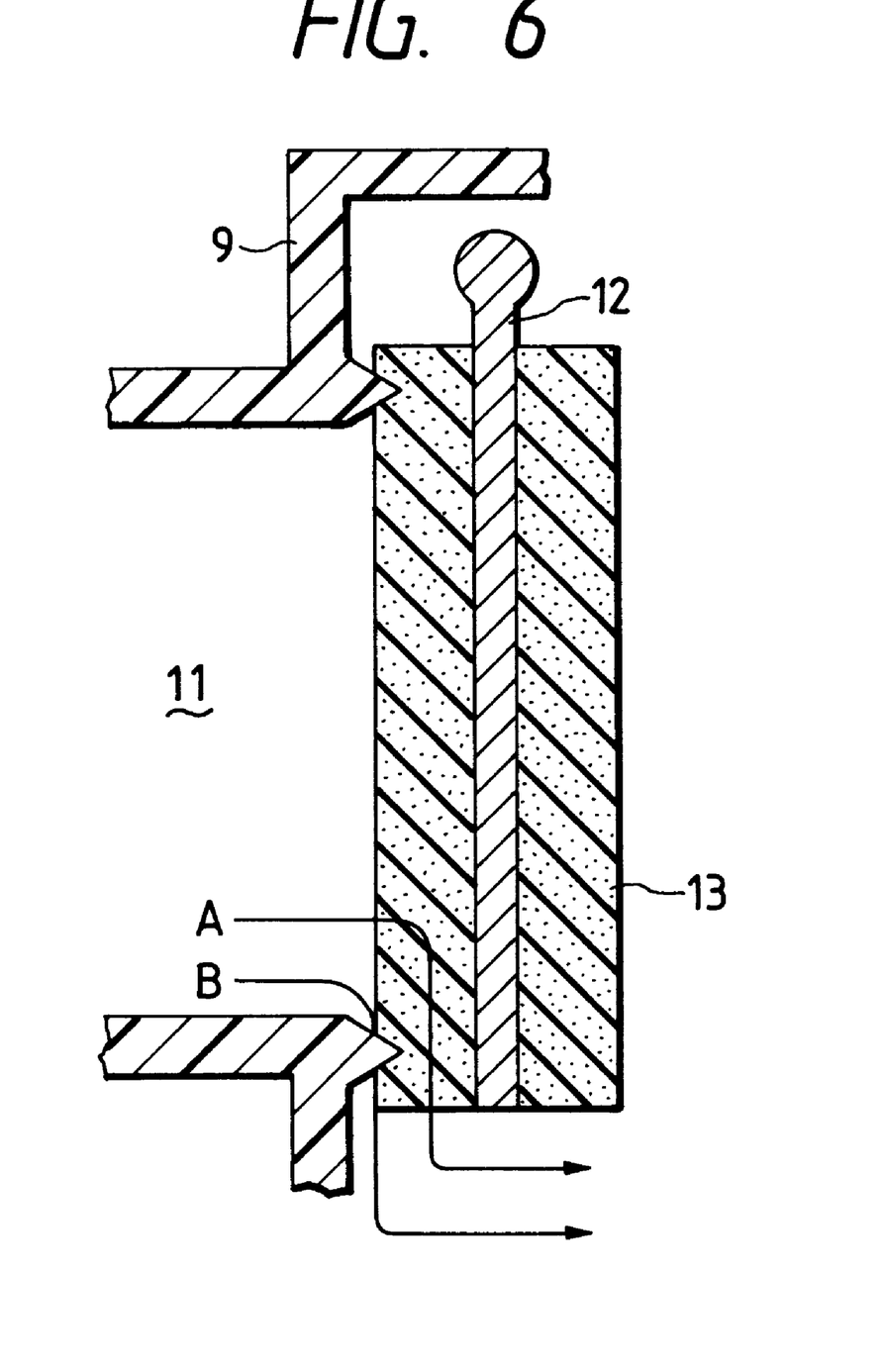
FIG. 6 is a cross-sectional view showing a condition under which a door for a conditioner is pushed to a peripheral edge inside a port of an automotive conditioner case.

The door 1 for conditioner for use in an automotive conditioner 2 generally comprises a rotary shaft 11, a substrate 12 and a sealant layer 13, as shown in FIG. 4. Although the sealant layer 13 is constituted in such a manner that it is adhered to the substrate 12, the sealant layer may be directly foam-molded on the substrate 12. The function of the door is to open, close or switch the air passage in the cases 9 and 16 of the automotive conditioner 2, as shown in FIG. 5. The closing of the air passage is performed, for example, by pushing the sealant layer 13 to the peripheral edge inside the port of cases 9 and 16, as shown in FIG. 6. However, when a part of cell membrane is destroyed by the ozone deterioration or oxidation deterioration due to an oxidant, etc., in the exhaust, the air permeability of the resulting sealant is increased. Consequently, the amount of air permeated through a route of A as shown in FIG. 6 is increased, and the sealing ability is decreased. On the other hand, when the sealant layer 13 pushed to the peripheral edge inside the port of the cases 9 and 16 is deteriorated by ozone, etc., and a part of the surface of the sealant layer is broken off or the compressive strain of the sealant layer 13 is not sufficiently recovered, the amount of air permeated through a route of B as shown in FIG. 6 is increased, and the sealing ability of the door 1 for conditioner is decreased.

As the sealant layer for the door for the conditioner of the present invention, a sealing foam which is produced from a foamable composition prepared by compounding reaction mixture with an ozone inhibitor ingredient such as a secondary amine compound, etc. can be used, by which the decrease in the sealing ability can be inhibited. Further, the decrease in the sealing ability can be more certainly inhibited by using a mixture of a polyether polyol and a polyester polyol in a given mixing ratio or using a polyester-polyether polyol having both an ester segment and an ether segment in the molecule. All the polyether polyol, the polyester polyol and the polyester-polyether polyol may be use in combination. In addition, the sealing foam for use in the door for the conditioner can be used not only for the sealant for the door but also a sealant for joint portions between the cases and the ducts of the conditioner by interposing it therebetween.

The retention of tensile strength is determined using the following equation.

$$\text{Retention} = \frac{\text{Tensile strength after exposure to the atmosphere}}{\text{Tensile strength before exposure}} \times 100(\%)$$

The resistance to wet heat aging is not influenced by the kind and incorporation amount of the secondary amine compound, and sealing foams having the same excellent capacities are obtained with any secondary amine compound. The fact that the sealing foam of the present invention has such a high retention of tensile strength in the above severe accelerated test indicates that the foam has reduced susceptibility to hydrolysis.

In the present invention, a blowing agent, a catalyst, a foam stabilizer, and other optional ingredients are incorporated into the foamable composition besides the ingredients described above. Although water is mainly used as the blowing agent, it can be used in combination with dichloromethane or the like for the purpose of inhibiting heat generation. The catalyst usually comprises a combination of an amine catalyst, in particular a tertiary amine, and an organotin compound, e.g., stannous octoate, dibutyltin diacetate, or dibutyltin dilaurate. The foam stabilizer may be a generally used block copolymer of dimethylpolysiloxane with a polyether. A colorant, a filler, and other ingredients may be further incorporated if desired and necessary.

The present invention will be explained below in more detail by reference to the following Examples, but the invention should not be construed as being limited thereto.

EXAMPLES AND COMPARATIVE EXAMPLES

Soft slab foams were produced by an ordinary method from foamable compositions comprising the polyols shown in Tables 1 to 5 (Comparative Examples) and Tables 6 to 11 (Examples), the secondary amine compounds (in the case of Tables 6 to 11) or other ingredients including various antioxidants and plasticizers (in the case of Tables 1 to 5), and the polyisocyanate, catalysts, and foam stabilizers shown below. In Tables 1 to 11, the numerals given for the secondary amine compounds and other ingredients including various antioxidants indicate the amounts (part(s) by weight) of the respective ingredients per 100 parts by weight of the whole polyol ingredient.

(1) Polyisocyanate: "TDI 80" (trade name), manufactured by Nippon Polyurethane Industry Co., Ltd., Japan, was used in an amount of 41.5 parts by weight.

(2) Catalysts: Amine catalyst "LV33" (trade name), manufactured by Nippon Nyukazai Co., Ltd., Japan, and stannous octoate (SO) manufactured by Johoku Chemical Industry Co., Ltd., Japan were used each in an amount of 0.3 parts by weight.

(3) Foam stabilizers: "SH193" (trade name), manufactured by Toray-Dow Corning Co., Ltd., Japan, was used in an amount of 1.5 parts by weight, provided that in Comparative Example 1, "L532" (trade name), manufactured by Nippon Unicar Co., Ltd., Japan, was used in an amount of 1.5 parts by weight.

TABLE 1

|  |  | Comp. Ex. 1 | Comp. Ex. 2 | Comp. Ex. 3 | Comp. Ex. 4 | Comp. Ex. 5 |
|---|---|---|---|---|---|---|
| Polyol | #3000 (ether) | — | 100 | — | — | — |
|  | 3P56B (ester-ether) | — | — | 100 | 100 | 100 |
|  | N2200 (ester) | 100 | — | — | — | — |
| Hindered phenol | Nocrac 200 | — | — | — | 1.0 | 5.0 |
|  | Nocrac NS6 | — | — | — | — | — |
| Density (kg/m$^3$) |  | 35.0 | 34.6 | 36.2 | 36.2 | 36.0 |
| Air permeability (cc/cm$^2$/sec) |  | ≦0.35 | ≦0.35 | ≦0.35 | ≦0.35 | ≦0.35 |
| Air permeability after ozone exposure | 50 Hr | 2.5 | 25.0 | 4.0 | 4.0 | 4.1 |
|  | 100 Hr | 5.0 | 150.0 | 24.0 | 24.0 | 24.0 |
|  | 200 Hr | 15.0 | ≧200 | 130.0 | 130.0 | 123.5 |
|  | 400 Hr | 98.0 | — | ≧200 | ≧200 | ≧200 |
| Tensile strength (kg/cm$^2$) |  | 1.40 | 0.80 | 1.20 | 1.20 | 1.18 |
| Tensile strength after exposure to 80° C. and 95% RH (retention) | 300 Hr | 0.74 (53) | 0.78 (98) | 1.16 (97) | — | — |
|  | 600 Hr | 0.35 (25) | 0.76 (95) | 1.14 (95) | — | — |
|  | 900 Hr | 0 | 0.68 (85) | 1.02 (85) | — | — |
|  | 1200 Hr | — | 0.64 (80) | 0.96 (80) | — | — |
|  | 1600 Hr | — | 0.64 (80) | 0.90 (75) | — | — |

|  |  | Comp. Ex. 6 | Comp. Ex. 7 | Comp. Ex. 8 | Comp. Ex. 9 |
|---|---|---|---|---|---|
| Polyol | #3000 (ether) | — | — | — | — |
|  | 3P56B (ester-ether) | 100 | 100 | 100 | 100 |
|  | N2200 (ester) | — | — | — | — |
| Hindered phenol | Nocrac 200 | 10.0 | 15.0 | — | — |
|  | Nocrac NS6 | — | — | 5.0 | 10.0 |
| Density (kg/m$^3$) |  | 36.5 | 36.8 | 37.3 | 36.2 |
| Air permeability (cc/cm$^2$/sec) |  | ≦0.35 | ≦0.35 | ≦0.35 | ≦0.35 |
| Air permeability after ozone exposure | 50 Hr | 3.8 | 4.3 | 3.5 | 5.2 |
|  | 100 Hr | 21.0 | 22.5 | 19.5 | 23.7 |
|  | 200 Hr | 150.0 | 125.0 | 125.0 | 128.0 |
|  | 400 Hr | ≧200 | ≧200 | ≧200 | ≧200 |
| Tensile strength (kg/cm$^2$) |  | 1.18 | 1.20 | 1.15 | 1.14 |
| Tensile strength after exposure to 80° C. and 95% RH (retention) | 300 Hr | — | — | — | — |
|  | 600 Hr | — | — | — | — |
|  | 900 Hr | — | — | — | — |
|  | 1200 Hr | — | — | — | — |
|  | 1600 Hr | — | — | — | — |

TABLE 2

|  |  | Comp. Ex. 10 | Comp. Ex. 11 | Comp. Ex. 12 | Comp. Ex. 13 | Comp. Ex. 14 |
|---|---|---|---|---|---|---|
| 3P56B (ester-ether polyol) |  | 100 | 100 | 100 | 100 | 100 |
| Hindered phenol | Nocrac NS6 | 15.0 | — | — | — | — |
|  | Irganox 1010 | — | 5.0 | 10.0 | 15.0 | — |
| Imidazole | Nocrac MMB | — | — | — | — | 1.0 |
|  | Nocrac MBZ | — | — | — | — | — |
| Density (kg/m$^3$) |  | 36.9 | 34.9 | 35.3 | 36.9 | 34.5 |
| Air permeability (cc/cm$^2$/sec) |  | ≦0.35 | ≦0.35 | ≦0.35 | ≦0.35 | ≦0.35 |
| Air permeability after ozone exposure | 50 Hr | 5.8 | 5.5 | 5.1 | 4.8 | 3.8 |
|  | 100 Hr | 22.6 | 24.1 | 27.8 | 25.1 | 26.5 |
|  | 200 Hr | 104.3 | 115.7 | 124.1 | 133.2 | 123.3 |
|  | 400 Hr | ≧200 | ≧200 | ≧200 | ≧200 | ≧200 |
| Tensile strength (kg/cm$^2$) |  | 1.20 | 1.17 | 1.18 | 1.22 | 1.23 |

|  |  | Comp. Ex. 15 | Comp. Ex. 16 | Comp. Ex. 17 | Comp. Ex. 18 |
|---|---|---|---|---|---|
| 3P56B (ester-ether polyol) |  | 100 | 100 | 100 | 100 |
| Hindered phenol | Nocrac NS6 | — | — | — | — |
|  | Irganox 1010 | — | — | — | — |
| Imidazole | Nocrac MMB | 5.0 | 10.0 | 15.0 | — |
|  | Nocrac MBZ | — | — | — | 1.0 |
| Density (kg/m$^3$) |  | 35.3 | 35.7 | 35.1 | 35.6 |
| Air permeability (cc/cm$^2$/sec) |  | ≦0.35 | ≦0.35 | ≦0.35 | ≦0.35 |
| Air permeability after ozone exposure | 50 Hr | 4.5 | 2.5 | 4.1 | 4.0 |
|  | 100 Hr | 25.6 | 18.1 | 21.3 | 24.5 |
|  | 200 Hr | 127.4 | 101.3 | 123.1 | 128.5 |
|  | 400 Hr | ≧200 | ≧200 | ≧200 | ≧200 |
| Tensile strength (kg/cm$^2$) |  | 1.19 | 1.21 | 1.18 | 1.23 |

TABLE 3

|  | Comp. Ex. 19 | Comp. Ex. 20 | Comp. Ex. 21 | Comp. Ex. 22 | Comp. Ex. 23 |
|---|---|---|---|---|---|
| 3P56B (ester-ether polyol) | 100 | 100 | 100 | 100 | 100 |
| Imidazole Nocrac MBZ | 5.0 | 10.0 | 15.0 | — | — |
| Phosphite JP360 | — | — | — | 5.0 | 10.0 |
| JP351 | — | — | — | — | — |
| Density (kg/m$^3$) | 35.3 | 35.8 | 36.5 | 35.1 | 35.8 |
| Air permeability (cc/cm$^2$/sec) | ≦0.35 | ≦0.35 | ≦0.35 | ≦0.35 | 2.3 |
| Air permeability 50 Hr | 4.7 | 5.3 | 5.5 | 4.6 | 6.8 |
| after ozone exposure 100 Hr | 31.1 | 21.5 | 25.1 | 22.9 | 28.1 |
| 200 Hr | 122.3 | 109.2 | 125.3 | 118.2 | 128.3 |
| 400 Hr | ≧200 | ≧200 | ≧200 | ≧200 | ≧200 |
| Tensile strength (kg/cm$^2$) | 1.15 | 1.21 | 1.13 | 1.25 | 1.17 |

|  | Comp. Ex. 24 | Comp. Ex. 25 | Comp. Ex. 26 | Comp. Ex. 27 |
|---|---|---|---|---|
| 3P56B (ester-ether polyol) | 100 | 100 | 100 | 100 |
| Imidazole Nocrac MBZ | — | — | — | — |
| Phosphite JP360 | 20.0 | — | — | — |
| JP351 | — | 5.0 | 10.0 | 20.0 |
| Density (kg/m$^3$) | 37.2 | 35.5 | 36.5 | 38.2 |
| Air permeability (cc/cm$^2$/sec) | 4.2 | 4.5 | 5.8 | 8.5 |
| Air permeability 50 Hr | 12.3 | 16.2 | 18.2 | 28.3 |
| after ozone exposure 100 Hr | 35.2 | 39.5 | 52.3 | 121.5 |
| 200 Hr | 158.2 | 187.3 | ≧200 | ≧200 |
| 400 Hr | ≧200 | ≧200 | — | — |
| Tensile strength (kg/cm$^2$) | 1.15 | 1.21 | 1.23 | 1.18 |

TABLE 4

|  | Comp. Ex. 28 | Comp. Ex. 29 | Comp. Ex. 30 | Comp. Ex. 31 | Comp. Ex. 32 |
|---|---|---|---|---|---|
| 3P56B (ester-ether polyol) | 100 | 100 | 100 | 100 | 100 |
| Phosphite JP650 | 5.0 | 10.0 | 20.0 | — | — |
| JPP13 | — | — | — | 5.0 | 10.0 |
| DOP (ester plasticizer) | — | — | — | — | — |
| Density (kg/m$^3$) | 35.2 | 36.3 | 37.8 | 35.1 | 35.6 |
| Air permeability (cc/cm$^2$/sec) | 2.1 | 4.5 | 12.1 | 2.4 | 2.3 |
| Air permeability 50 Hr | 8.2 | 28.3 | 88.6 | 45.1 | 60.1 |
| after ozone exposure 100 Hr | 28.5 | 121.3 | ≧200 | 151.3 | 185.5 |
| 200 Hr | 181.2 | ≧200 | — | ≧200 | ≧200 |
| 400 Hr | ≧200 | — | — | — | — |
| Tensile strength (kg/cm$^2$) | 1.22 | 1.15 | 1.17 | 1.23 | 1.12 |

|  | Comp. Ex. 33 | Comp. Ex. 34 | Comp. Ex. 35 | Comp. Ex. 36 |
|---|---|---|---|---|
| 3P56B (ester-ether polyol) | 100 | 100 | 100 | 100 |
| Phosphite JP650 | — | — | — | — |
| JPP13 | 20.0 | — | — | — |
| DOP (ester plasticizer) | — | 10.0 | 20.0 | 40.0 |
| Density (kg/m$^3$) | 37.6 | 36.5 | 38.3 | 38.2 |
| Air permeability (cc/cm$^2$/sec) | 5.3 | 4.4 | 18.5 | 54.3 |
| Air permeability 50 Hr | 91.2 | 71.3 | ≧200 | ≧200 |
| after ozone exposure 100 Hr | ≧200 | ≧200 | — | — |
| 200 Hr | — | — | — | — |
| 400 Hr | — | — | — | — |
| Tensile strength (kg/cm$^2$) | 1.18 | 1.15 | 1.12 | 1.18 |

TABLE 5

|  | Comp. Ex. 37 | Comp. Ex. 38 | Comp. Ex. 39 | Comp. Ex. 40 |
|---|---|---|---|---|
| 3P56B (ester-ether polyol) | 100 | 100 | 100 | 100 |
| DOA (ester plasticizer) | 10.0 | 20.0 | 40.0 | — |
| Hydrocarbon Hisole LH | — | — | — | 10.0 |
| Liquid paraffin | — | — | — | — |
| Density (kg/m$^3$) | 37.1 | 39.4 | 43.5 | 37.1 |
| Air permeability (cc/cm$^2$/sec) | 15.1 | 28.3 | 58.6 | 4.1 |
| Air permeability 50 Hr | 187.6 | ≧200 | ≧200 | 26.3 |
| after ozone exposure 100 Hr | ≧200 | — | — | 125.9 |
| 200 Hr | — | — | — | ≧200 |
| 400 Hr | — | — | — | — |
| Tensile strength (kg/cm$^2$) | 1.08 | 1.08 | 1.03 | 1.10 |

TABLE 5-continued

|  | Comp. Ex. 41 | Comp. Ex. 42 | Comp. Ex. 43 | Comp. Ex. 44 |
|---|---|---|---|---|
| 3P56B (ester-ether polyol) | 100 | 100 | 100 | 100 |
| DOA (ester plasticizer) | — | — | — | — |
| Hydrocarbon Hisole LH | 20.0 | 40.0 | — | — |
| Liquid paraffin | — | — | 10.0 | 20.0 |
| Density (kg/m$^3$) | 39.2 | 42.1 | 36.5 | 37.8 |
| Air permeability (cc/cm$^2$/sec) | 6.2 | 25.9 | 25.6 | 31.2 |
| Air permeability 50 Hr | 24.8 | 50.3 | 85.3 | 165.2 |
| after ozone exposure 100 Hr | 80.6 | 123.2 | 175.3 | ≧200 |
| 200 Hr | 160.2 | 181.3 | ≧200 | — |
| 400 Hr | ≧200 | ≧200 | — | — |
| Tensile strength (kg/cm$^2$) | 1.08 | 1.05 | 1.22 | 1.12 |

TABLE 6

|  | Ex. 1 | Ex. 2 | Ex. 3 | Ex. 4 | Ex. 5 |
|---|---|---|---|---|---|
| 3P56B (ester-ether polyol) | 100 | 100 | 100 | 100 | 100 |
| Secondary Nocrac 224 | 1.0 | 5.0 | 10.0 | 15.0 | 20.0 |
| amine Nocrac AW | — | — | — | — | — |
| Density (kg/m$^3$) | 35.1 | 35.6 | 36.5 | 37.4 | 38.2 |
| Air permeability (cc/cm$^2$/sec) | ≦0.35 | ≦0.35 | ≦0.35 | ≦0.35 | ≦0.35 |
| Air permeability 50 Hr | 2.1 | ≦0.35 | ≦0.35 | ≦0.35 | ≦0.35 |
| after ozone exposure 100 Hr | 8.3 | 2.1 | ≦0.35 | ≦0.35 | ≦0.35 |
| 200 Hr | 25.3 | 4.5 | 1.9 | 1.9 | 2.5 |
| 400 Hr | 131.5 | 15.3 | 8.9 | 4.5 | 4.5 |
| Tensile strength (kg/cm$^2$) | 1.21 | 1.19 | 1.22 | 1.21 | 1.16 |
| Tensile strength 300 Hr | 1.17 (97) | 1.15 (97) | — | 1.17 (97) | — |
| after exposure to 600 Hr | 1.15 (95) | 1.13 (95) | — | 1.15 (95) | — |
| 80° C. and 95% RH 900 Hr | 1.03 (85) | 1.01 (85) | — | 1.03 (85) | — |
| (retention) 1200 Hr | 0.97 (80) | 0.95 (80) | — | 0.97 (80) | — |
| 1600 Hr | 0.91 (75) | 0.89 (75) | — | 0.91 (75) | — |

|  | Ex. 6 | Ex. 7 | Ex. 8 | Ex. 9 |
|---|---|---|---|---|
| 3P56B (ester-ether polyol) | 100 | 100 | 100 | 100 |
| Secondary Nocrac 224 | — | — | — | — |
| amine Nocrac AW | 1.0 | 5.0 | 10.0 | 15.0 |
| Density (kg/m$^3$) | 35.4 | 35.5 | 36.5 | 37.5 |
| Air permeability (cc/cm$^2$/sec) | ≦0.35 | ≦0.35 | ≦0.35 | ≦0.35 |
| Air permeability 50 Hr | 3.1 | ≦0.35 | ≦0.35 | ≦0.35 |
| after ozone exposure 100 Hr | 7.6 | 2.1 | ≦0.35 | ≦0.35 |
| 200 Hr | 18.6 | 4.5 | 2.5 | 1.9 |
| 400 Hr | 96.2 | 15.3 | 6.5 | 4.5 |
| Tensile strength (kg/cm$^2$) | 1.18 | 1.21 | 1.15 | 1.09 |
| Tensile strength 300 Hr | — | 1.17 (97) | — | — |
| after exposure to 600 Hr | — | 1.15 (95) | — | — |
| 80° C. and 95% RH 900 Hr | — | 1.03 (85) | — | — |
| (retention) 1200 Hr | — | 0.97 (80) | — | — |
| 1600 Hr | — | 0.91 (75) | — | — |

TABLE 7

|  | Ex. 10 | Ex. 11 | Ex. 12 | Ex. 13 | Ex. 14 |
|---|---|---|---|---|---|
| 3P56B (ester-ether polyol) | 100 | 100 | 100 | 100 | 100 |
| Secondary Nocrac AW | 20.0 | 25.0 | — | — | — |
| amine Nocrac AD | — | — | 1.0 | 5.0 | 10.0 |
| Nocrac ODA | — | — | — | — | — |
| Density (kg/m$^3$) | 37.1 | 38.6 | 35.4 | 35.6 | 36.5 |
| Air permeability (cc/cm$^2$/sec) | ≦0.35 | ≦0.35 | ≦0.35 | ≦0.35 | ≦0.35 |
| Air permeability 50 Hr | ≦0.35 | ≦0.35 | ≦0.35 | ≦0.35 | ≦0.35 |
| after ozone exposure 100 Hr | ≦0.35 | ≦0.35 | 6.5 | 2.1 | ≦0.35 |
| 200 Hr | ≦0.35 | ≦0.35 | 18.9 | 4.5 | 1.9 |
| 400 Hr | 5.1 | 5.9 | 102.9 | 15.3 | 5.6 |
| Tensile strength (kg/cm$^2$) | 1.19 | 1.15 | 1.25 | 1.19 | 1.22 |

|  | Ex. 15 | Ex. 16 | Ex. 17 | Ex. 18 |
|---|---|---|---|---|
| 3P56B (ester-ether polyol) | 100 | 100 | 100 | 100 |
| Secondary Nocrac AW | — | — | — | — |
| amine Nocrac AD | 15.0 | 20.0 | 25.0 | — |
| Nocrac ODA | — | — | — | 1.0 |

TABLE 7-continued

| | | | | |
|---|---|---|---|---|
| Density (kg/m³) | 37.4 | 38.2 | 40.3 | 35.0 |
| Air permeability (cc/cm²/sec) | ≦0.35 | ≦0.35 | ≦0.35 | ≦0.35 |
| Air permeability 50 Hr | ≦0.35 | ≦0.35 | ≦0.35 | 1.8 |
| after ozone exposure 100 Hr | ≦0.35 | ≦0.35 | ≦0.35 | 2.1 |
| 200 Hr | ≦0.35 | ≦0.35 | ≦0.35 | 6.3 |
| 400 Hr | 4.5 | 4.5 | 2.5 | 14.2 |
| Tensile strength (kg/cm²) | 1.21 | 1.16 | 1.08 | 1.21 |

TABLE 8

| | | Ex. 19 | Ex. 20 | Ex. 21 | Ex. 22 | Ex. 23 |
|---|---|---|---|---|---|---|
| 3P56B (ester-ether polyol) | | 100 | 100 | 100 | 100 | 100 |
| Secondary amine | Nocrac ODA | 5.0 | 10.0 | 15.0 | 20.0 | 25.0 |
| | Nocrac CD | — | — | — | — | — |
| Density (kg/m³) | | 35.6 | 36.5 | 37.4 | 38.2 | 40.3 |
| Air permeability (cc/cm²/sec) | | ≦0.35 | ≦0.35 | ≦0.35 | ≦0.35 | ≦0.35 |
| Air permeability 50 Hr | | ≦0.35 | ≦0.35 | ≦0.35 | ≦0.35 | ≦0.35 |
| after ozone exposure 100 Hr | | ≦0.35 | ≦0.35 | ≦0.35 | ≦0.35 | ≦0.35 |
| 200 Hr | | 1.5 | ≦0.35 | ≦0.35 | ≦0.35 | ≦0.35 |
| 400 Hr | | 4.5 | 2.0 | 2.1 | 1.8 | 1.5 |
| Tensile strength (kg/cm²) | | 1.19 | 1.22 | 1.21 | 1.16 | 1.08 |

| | | Ex. 24 | Ex. 25 | Ex. 26 | Ex. 27 |
|---|---|---|---|---|---|
| 3P56B (ester-ether polyol) | | 100 | 100 | 100 | 100 |
| Secondary amine | Nocrac ODA | — | — | — | — |
| | Nocrac CD | 1.0 | 5.0 | 10.0 | 15.0 |
| Density (kg/m³) | | 35.0 | 35.3 | 36.8 | 37.7 |
| Air permeability (cc/cm²/sec) | | ≦0.35 | ≦0.35 | ≦0.35 | ≦0.35 |
| Air permeability 50 Hr | | 1.8 | ≦0.35 | ≦0.35 | ≦0.35 |
| after ozone exposure 100 Hr | | 6.5 | 2.1 | ≦0.35 | ≦0.35 |
| 200 Hr | | 18.9 | 4.5 | 1.9 | ≦0.35 |
| 400 Hr | | 102.9 | 15.3 | 5.6 | 4.5 |
| Tensile strength (kg/cm²) | | 1.22 | 1.19 | 1.22 | 1.19 |

TABLE 9

| | | Ex. 28 | Ex. 29 | Ex. 30 | Ex. 31 | Ex. 32 |
|---|---|---|---|---|---|---|
| #3000 (ether) | | — | — | — | — | — |
| 3P56B (ester-ether polyol) | | 100 | 100 | 100 | 100 | 100 |
| Secondary amine | Nocrac ODA | — | — | — | — | — |
| | Nocrac CD | 20.0 | 25.0 | — | — | — |
| | Nocrac DP | — | — | 1.0 | 5.0 | 10.0 |
| Density (kg/m³) | | 38.1 | 40.3 | 35.9 | 36.5 | 36.8 |
| Air permeability (cc/cm²/sec) | | ≦0.35 | ≦0.35 | ≦0.35 | ≦0.35 | ≦0.35 |
| Air permeability 50 Hr | | ≦0.35 | ≦0.35 | 2.3 | ≦0.35 | ≦0.35 |
| after ozone 100 Hr | | ≦0.35 | ≦0.35 | 7.8 | 2.5 | ≦0.35 |
| exposure 200 Hr | | ≦0.35 | ≦0.35 | 15.6 | 8.5 | 2.1 |
| 400 Hr | | 2.3 | 2.1 | 74.6 | 18.6 | 5.4 |
| Tensile strength (kg/cm²) | | 1.09 | 1.05 | 1.12 | 1.10 | 1.15 |
| Tensile strength 300 Hr | | — | — | — | — | — |
| after exposure to 600 Hr | | — | — | — | — | — |
| 80° C. and 95% RH 900 Hr | | — | — | — | — | — |
| (retention) 1200 Hr | | — | — | — | — | — |
| 1600 Hr | | — | — | — | — | — |

| | | Ex. 33 | Ex. 34 | Ex. 35 | Ex. 36 |
|---|---|---|---|---|---|
| #3000 (ether) | | — | — | — | 50 |
| 3P56B (ester-ether polyol) | | 100 | 100 | 100 | 50 |
| Secondary amine | Nocrac ODA | — | — | — | 5.0 |
| | Nocrac CD | — | — | — | — |
| | Nocrac DP | 15.0 | 20.0 | 25.0 | — |
| Density (kg/m³) | | 37.5 | 39.1 | 41.5 | 36.3 |
| Air permeability (cc/cm²/sec) | | ≦0.35 | ≦0.35 | ≦0.35 | ≦0.35 |
| Air permeability 50 Hr | | <0.35 | ≦0.35 | ≦0.35 | ≦0.35 |
| after ozone exposure 100 Hr | | ≦0.35 | ≦0.35 | ≦0.35 | ≦0.35 |
| 200 Hr | | ≦0.35 | ≦0.35 | ≦0.35 | 5.6 |
| 400 Hr | | 2.6 | 1.5 | 2.0 | 9.4 |
| Tensile strength (kg/cm²) | | 1.14 | 1.04 | 1.05 | 1.21 |
| Tensile strength 300 Hr | | — | — | — | 1.19 (98) |
| after exposure to 600 Hr | | — | — | — | 1.15 (95) |

TABLE 9-continued

| | | | | | |
|---|---|---|---|---|---|
| 80° C. and 95% RH (retention.) | 900 Hr | — | — | — | 1.09 (90) |
| | 1200 Hr | — | — | — | 1.03 (85) |
| | 1600 Hr | — | — | — | 0.97 (80) |

TABLE 10

| | | Ex. 37 | Ex. 38 | Ex. 39 | Ex. 40 | Ex. 41 |
|---|---|---|---|---|---|---|
| Polyol | #3000 (ether) | 65 | — | 30 | 75 | 85 |
| | 3P56B (ester-ether) | 35 | 75 | 45 | — | — |
| Ester | N2200 | — | 25 | 25 | — | — |
| | Teslac 2458 | — | — | — | 25 | 15 |
| | Kurapol F2010 | — | — | — | — | — |
| | Kurapol L2010 | — | — | — | — | — |
| Secondary amine | Nocrac ODA | 5.0 | 5.0 | 5.0 | 5.0 | 5.0 |
| Density (kg/m$^3$) | | 36.1 | 35.9 | 35.1 | 35.0 | 34.6 |
| Air permeability (cc/cm$^2$/sec) | | ≦0.35 | ≦0.35 | ≦0.35 | ≦0.35 | ≦0.35 |
| Air permeability | 50 Hr | ≦0.35 | ≦0.35 | ≦0.35 | ≦0.35 | ≦0.35 |
| after ozone exposure | 100 Hr | ≦0.35 | ≦0.35 | ≦0.35 | ≦0.35 | ≦0.35 |
| | 200 Hr | 1.8 | 2.5 | 1.8 | 2.4 | 2.1 |
| | 400 Hr | 2.6 | 5.6 | 2.4 | 5.9 | 4.5 |
| Tensile strength (kg/cm$^2$) | | 1.14 | 1.17 | 1.25 | 0.83 | 0.97 |
| Tensile strength | 300 Hr | 1.12 (98) | 1.05 (90) | 1.13 (90) | 0.79 (95) | — |
| after exposure to | 600 Hr | 1.08 (95) | 0.99 (85) | 1.06 (85) | 0.75 (90) | — |
| 80° C. and 95% RH | 900 Hr | 1.03 (90) | 0.94 (80) | 1.00 (80) | 0.72 (87) | — |
| (retention) | 1200 Hr | 0.97 (85) | 0.76 (65) | 0.81 (65) | 0.69 (83) | — |
| | 1600 Hr | 0.91 (80) | 0.59 (50) | 0.63 (50) | 0.67 (81) | — |

| | | Ex. 42 | Ex. 43 | Ex. 44 | Ex. 45 |
|---|---|---|---|---|---|
| Polyol | #3000 (ether) | 75 | 85 | 75 | 85 |
| | 3P56B (ester-ether) | — | — | — | — |
| Ester | N2200 | — | — | — | — |
| | Teslac 2458 | — | — | — | — |
| | Kurapol F2010 | 25 | 15 | — | — |
| | Kurapol L2010 | — | — | 25 | 15 |
| Secondary amine | Nocrac ODA | 5.0 | 5.0 | 5.0 | 5.0 |
| Density (kg/m$^3$) | | 35.4 | 35.8 | 35.6 | 35.8 |
| Air permeability (cc/cm$^2$/sec) | | ≦0.35 | ≦0.35 | ≦0.35 | ≦0.35 |
| Air permeability | 50 Hr | ≦0.35 | ≦0.35 | ≦0.35 | ≦0.35 |
| after ozone exposure | 100 Hr | ≦0.35 | ≦0.35 | ≦0.35 | ≦0.35 |
| | 200 Hr | 1.3 | 1.4 | 2.3 | 1.8 |
| | 400 Hr | 2.1 | 2.9 | 2.6 | 5.6 |
| Tensile strength (kg/cm$^2$) | | 1.29 | 1.32 | 1.20 | 1.32 |
| Tensile strength | 300 Hr | 1.26 (98) | — | 1.18 (98) | — |
| after exposure to | 600 Hr | 1.23 (95) | — | 1.14 (95) | — |
| 80° C. and 95% RH | 900 Hr | 1.16 (90) | — | 1.08 (90) | — |
| (retention) | 1200 Hr | 1.10 (85) | — | 1.02 (85) | — |
| | 1600 Hr | 1.03 (80) | — | 0.96 (80) | — |

TABLE 11

| | | Ex. 46 | Ex. 47 | Ex. 48 | Ex. 49 | Ex. 50 |
|---|---|---|---|---|---|---|
| Polyol | #3000 (ether) | 75 | 85 | — | — | — |
| | 3P56B (ester-ether) | — | — | 75 | 75 | 85 |
| Ester | N2200 | — | — | 25 | — | — |
| | Teslac 2458 | — | — | — | 25 | 15 |
| | Kurapol F2010 | — | — | — | — | — |
| | Kurapol L2010 | — | — | — | — | — |
| | Placcel 220 | 25 | 15 | — | — | — |
| Secondary amine | Nocrac ODA | 5.0 | 5.0 | 5.0 | 5.0 | 5.0 |
| Density (kg/m$^3$) | | 36.5 | 35.9 | 35.6 | 35.0 | 34.6 |
| Air permeability (cc/cm$^2$/sec) | | ≦0.35 | ≦0.35 | ≦0.35 | ≦0.35 | ≦0.35 |
| Air permeability | 50 Hr | ≦0.35 | ≦0.35 | ≦0.35 | ≦0.35 | ≦0.35 |
| after ozone exposure | 100 Hr | ≦0.35 | ≦0.35 | ≦0.35 | ≦0.35 | ≦0.35 |
| | 200 Hr | 1.9 | 2.5 | 1.8 | 2.3 | 2.1 |
| | 400 Hr | 2.5 | 4.6 | 2.4 | 4.2 | 4.5 |
| Tensile strength (kg/cm$^2$) | | 1.25 | 1.15 | 1.35 | 1.20 | 1.32 |
| Tensile strength | 300 Hr | 1.23 (98) | 1.04 (90) | 1.22 (90) | 1.14 (95) | — |
| after exposure to | 600 Hr | 1.19 (95) | 0.98 (85) | 1.15 (85) | 1.08 (90) | — |
| 80° C. and 95% RH | 900 Hr | 1.13 (90) | 0.92 (80) | 1.08 (80) | 1.04 (87) | — |

TABLE 11-continued

|  |  |  |  |  |  |
|---|---|---|---|---|---|
| (retention) | 1200 Hr | 1.06 (85) | 0.75 (65) | 0.88 (65) | 1.00 (83) | — |
|  | 1600 Hr | 1.00 (80) | 0.58 (50) | 0.68 (50) | 0.97 (81) | — |

|  |  | Ex. 51 | Ex. 52 | Ex. 53 | Ex. 54 |
|---|---|---|---|---|---|
| Polyol | #3000 (ether) | — | — | — | — |
|  | 3P56B (ester-ether) | 75 | 85 | 75 | 85 |
| Ester | Teslac 2458 | — | — | — | — |
|  | Kurapol F2010 | — | — | — | — |
|  | Kurapol L2010 | 25 | 15 | — | — |
|  | Placcel 220 | — | — | 25 | 15 |
| Secondary amine | Nocrac ODA | 5.0 | 5.0 | 5.0 | 5.0 |
| Density (kg/m$^3$) |  | 35.5 | 35.8 | 35.1 | 35.0 |
| Air permeability (cc/cm$^2$/sec) |  | ≦0.35 | ≦0.35 | ≦0.35 | ≦0.35 |
| Air permeability | 50 Hr | ≦0.35 | ≦0.35 | ≦0.35 | ≦0.35 |
| after ozone exposure | 100 Hr | ≦0.35 | ≦0.35 | ≦0.35 | ≦0.35 |
|  | 200 Hr | 1.3 | 1.4 | 2.3 | 1.8 |
|  | 400 Hr | 2.1 | 2.9 | 2.6 | 5.6 |
| Tensile strength (kg/cm$^2$) |  | 1.35 | 1.30 | 1.33 | 1.36 |
| Tensile strength | 300 Hr | 1.32 (98) | — | 1.30 (98) | — |
| after exposure to | 600 Hr | 1.28 (95) | — | 1.26 (95) | — |
| 80° C. and 95% RH | 900 Hr | 1.22 (90) | — | 1.20 (90) | — |
| (retention) | 1200 Hr | 1.15 (85) | — | 1.13 (85) | — |
|  | 1600 Hr | 1.08 (80) | — | 1.06 (80) | — |

Details of the polyols, secondary amine compounds, various antioxidants, and other additives shown in Tables 1 to 11 are as follows.

[1] Polyols
(1) trade name "#3000" (manufactured by Sanyo Chemical Industries, Ltd., Japan): propylene oxide-based polyether polyol; hydroxyl value (OHV), 56
(2) trade name "3P56B" (manufactured by Takeda Chemical Industries, Ltd., Japan): 75/25 (by weight) mixture of a polyester-polyether polyol and the #3000 shown above, the polyol being produced by causing "PPG1500" (trade name; a polyether polyol manufactured by Takeda Chemical Industries, Ltd.) to add 10 mol % of phthalic acid and 10 mol % of propylene glycol; OHV, 56
(3) trade name "N2200" (manufactured by Nippon Polyurethane Industry Co., Ltd.): polyester polyol produced by condensing adipic acid with diethylene glycol (DEG) and trimethylolpropane; OHV, 60
(4) trade name "Teslac 2458" (manufactured by Hitachi Kasei Polymer Co., Ltd., Japan): polyester polyol produced by condensing a dimer acid with DEG; OHV, 70
(5) trade name "Kurapol F2010" (manufactured by Kuraray Co., Ltd., Japan): polyester polyol produced by condensing methylpentanediol with adipic acid; OHV, 56
(6) trade name "Kurapol L2010" (manufactured by Kuraray Co., Ltd.): polyester polyol produced by the ring-opening polymerization of methylvalerolactone; OHV, 56
(7) trade name "Placcel 220" (manufactured by Daicel Chemical Industries, Ltd., Japan): polyester polyol produced by the ring-opening polymerization of caprolactone; OHV, 56

[2] Secondary Amine Compounds
Of the secondary amine compounds and other antioxidants shown below, all the compounds having a trade name containing "Nocrac" are products of Ouchi-Shinko Chemical Industrial Co., Ltd., Japan.
(1) trade name "Nocrac 224": poly(2,2,4-trimethyl-1,2-dihydroquinone)
(2) trade name "Nocrac AW": 6-ethoxy-1,2-dihydro-2,2,4-trimethylquinoline
(3) trade name "Nocrac AD": octyl-substituted diphenylamine
(4) trade name "Nocrac ODA": alkylated diphenylamine
(5) trade name "Nocrac CD": 4,4'-(α,α-dimethylbenzyl)-diphenylamine
(6) trade name "Nocrac DP": N,N'-diphenyl-p-phenylenediamine

[3] Hindered Phenol Antioxidants
(1) trade name "Nocrac 200": 2,6-di-t-butylmethylphenol
(2) trade name "Nocrac NS6": 2,2'-methylenebis(4-methyl-6-t-butylphenol)
(3) trade name "Irganox 1010" (manufactured by Ciba-Geigy Ltd.): tetrakis[methylene-3-(3',5'-di-t-butyl-4'-hydroxyphenyl)propionato]methane

[4] Imidazole Antioxidants
(1) trade name "Nocrac MMB"; 2-mercaptomethylbenzimidazole
(2) trade name "Nocrac MBZ": zinc salt of 2-mercaptobenzimidazole

[5] Phosphite Antioxidants (all manufactured by Johoku Chemical Industry Co., Ltd.)
(1) trade name "JP360": triphenyl phosphite
(2) trade name "JP351": tris(nonylphenyl) phosphite
(3) trade name "JP650": tris(2,4-di-t-butylphenyl) phosphite
(4) trade name "JPP13": bis(tridecyl)pentaerythritol diphosphite

[6] Plasticizers, Hydrocarbons
(1) DOP: dioctyl phthalate
(2) DOA: dioctyl adipate
(3) trade name "Hisole SAS-LH": liquid petroleum resin (manufactured by Nippon Petrochemicals Co., Ltd., Japan)
(4) liquid paraffin Test pieces were cut out of the thus-obtained soft slab foams, and examined for density and tensile strength in accordance with JIS K 6301. Test pieces for an ozone deterioration test were also cut out. With respect to part of the Examples and Comparative Examples, 10 mm-thick sheets to be subjected to a wet heat aging test were cut out.

In the ozone deterioration test, air permeability was measured at each of 50, 100, 200, and 400 hours after the initiation of exposure. In the wet heat aging test, tensile strength was measured at each of 300, 600, 900, 1,200, and 1,600 hours after the initiation of exposure. The results obtained are shown in Tables 1 to 11.

Figure 1:
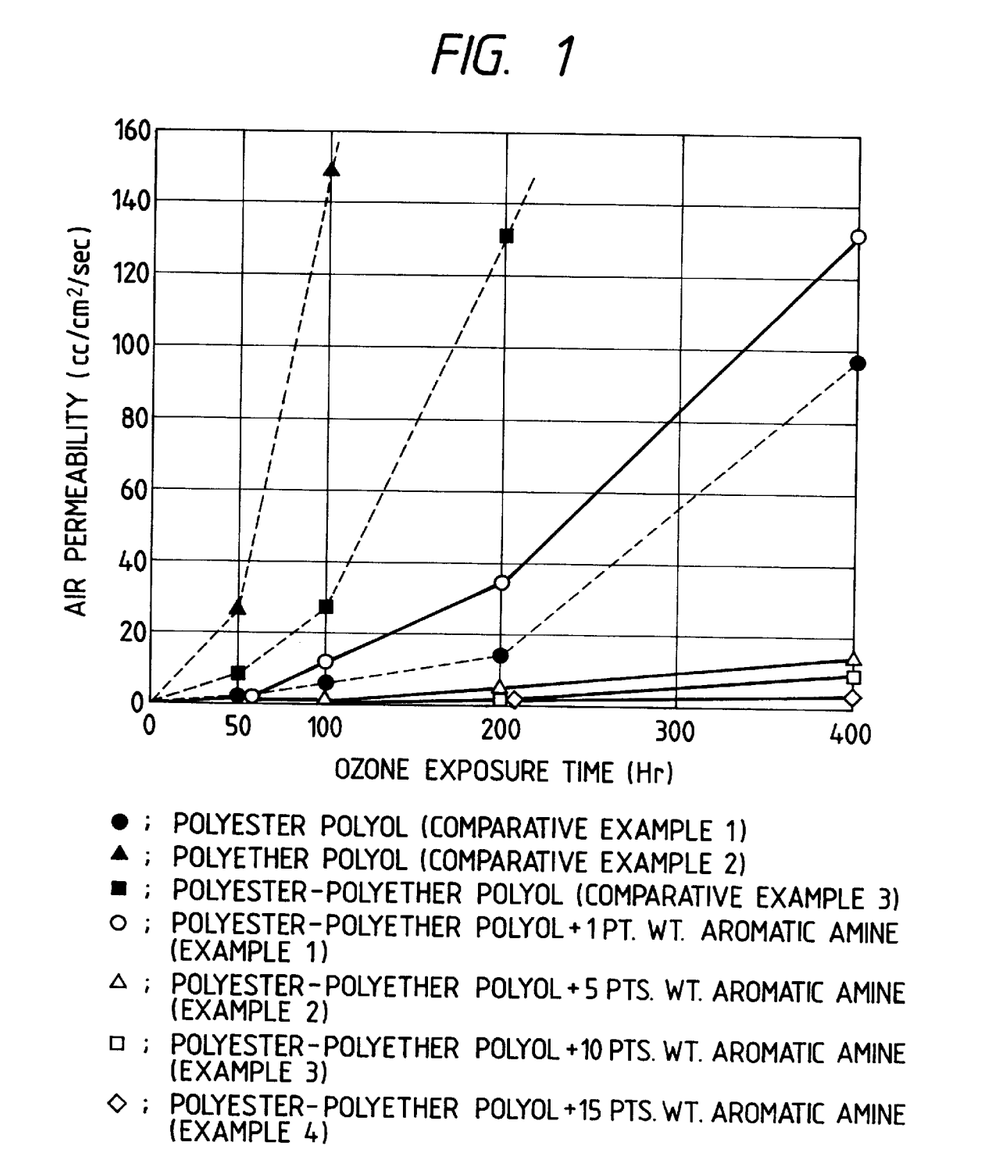
FIG. 1 shows the relationships between ozone exposure time and air permeability after ozone exposure in polyurethane foams which differ in the kinds of polyols or the amount of a secondary amine compound.
Figure 2:
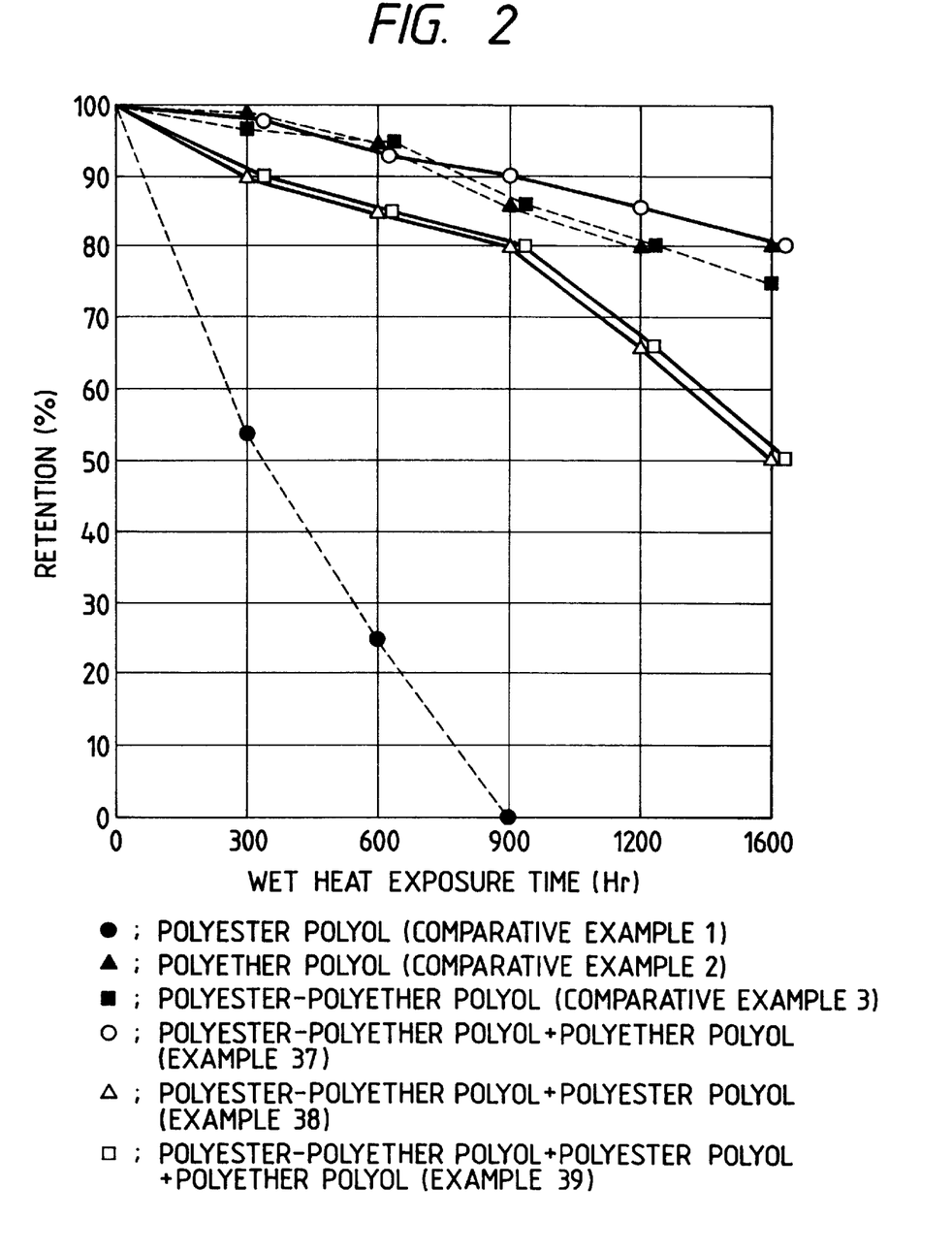
FIG. 2 shows the relationships between wet heat exposure time and retention of tensile strength in polyurethane foams which differ in the kinds of polyols or polyol combination.

The results for Comparative Examples 1 and 2 given in Table 1 clearly show advantages and disadvantages of ester foams and ether foams. The results for Comparative Example 3 show that the foam obtained using a polyester-polyether polyol had insufficiently improved resistance to ozone deterioration although having improved resistance to wet heat aging almost equal to that of ether foams. This is apparent also from comparisons among the data shown by ●, ▲, and ■ in FIG. 1 (air permeability vs. ozone exposure time) and in FIG. 2 (retention of tensile strength vs. wet heat exposure time).

The foams of Comparative Examples 4 to 44, shown in Tables 1 to 5, were produced from compositions each containing the above polyester-polyether polyol and from 1 to 20 parts by weight of one of hindered phenol, imidazole, and phosphite antioxidants, plasticizers, and hydrocarbons. However, most of these foams had an air permeability after 400-hour exposure to ozone of 200 $cc/cm^2/sec$ or higher. The foams produced using some kinds of compounds came to have an air permeability of 200 $cc/cm^2/sec$ or higher through 200-hour exposure, or through only 100-hour exposure. It can be seen from the above results that these antioxidants and the like were utterly ineffective in improving resistance to ozone deterioration.

On the other hand, the foams of Examples 1 to 35, shown in Tables 6 to 9, were produced from compositions each containing the above polyester-polyether polyol and from 1 to 25 parts by weight of one of various secondary amine compounds. The results for these Examples show that the foams produced with 1 part by weight of a secondary amine compound had considerably improved ozone resistance but were still insufficient in ozone resistance for use as sealing foams, except the foams of Examples 18 to 23, which were produced using Nocrac ODA (alkylated diphenylamine).

The results however show that when secondary amine compounds were incorporated in an amount of 5 parts by weight, the foams obtained had an air permeability after exposure to ozone of 20 $cc/cm^2/sec$ or lower regardless of the kinds of the amines, such capacity being sufficient for sealing foams. The results further show that the air permeability decreased with the increasing amount of secondary amine compounds. For example, the foamable compositions containing 10 parts by weight of a secondary amine compound gave sealing foams having excellent resistance to ozone deterioration with an air permeability of from 5.4 to 8.9 $cc/cm^2/sec$, without posing any particular problem in foam-producing process. Such relationship between the incorporation amount of secondary amines and resistance to ozone deterioration are also apparent from the results shown by ○, △, □, and ◇ in FIG. 1.

The relationship between the kind and amount of a secondary amine compound and the effect of improving resistance to ozone deterioration is also apparent from FIG. 3. In particular, the results show that Nocrac ODA, used in Examples 18 to 23 shown in Tables 7 and 8, was exceedingly effective as compared with the other secondary amine compounds.

The foam produced using Nocrac ODA in an amount as small as 1 part by weight had an air permeability after exposure to ozone of 14.2 $cc/cm^2/sec$, which was lower than those of the foams produced using 5 parts by weight of the other secondary amine compounds. The incorporation of Nocrac ODA in amounts of 5 and 10 parts by weight resulted in air permeabilities of 4.5 $cc/cm^2/sec$ and 2.0 $cc/cm^2/sec$, respectively. This secondary amine compound can hence be incorporated in a smaller amount than the other ones, so that it contributes to a further improvement in formability and makes foam production easier.

The results further show that in the Examples in which polyester-polyether polyol "3P56B" only was used as the polyol ingredient, the foams obtained had excellent resistance to wet heat aging, with the retention of tensile strength after 1,600-hour exposure to a high-temperature high-humidity atmosphere being 75% or higher in each foam. In the case where a combination of a polyester-polyether polyol or a polyether polyol with a polyester polyol was used, some of the foams produced had a retention of tensile strength after 1,600-hour exposure as low as about 50% (Example 38) depending on that combination. However, most of the foams produced using a combination of a polyether polyol and a polyester polyol had a retention of tensile strength even after 1,600-hour exposure of 80% or higher, showing that sealing foams having excellent capacities can be obtained.

A foam (Foam No. 1) produced using 75% by weight of a polyester polyol and 25% by weight of a polyether polyol and compounding a secondary amine compound therewith, a foam (Foam No. 2) produced using a polyether polyol alone and compounding a secondary amine compound therewith and a foam (Foam No.3) produced using a polyether polyol alone but compounding no secondary amine compound therewith each was exposed to ozone at 50 ppm at 40° C., and the change in air permeability was studied. As a result, in Foam No. 1, the air permeability was about 1.3 times larger than the initial one even after 430 hours. On the other hand, in Foam No. 3, the air permeability was 3.2 times larger than the initial one after 170 hours and 44 times larger than the initial one after 280 hours, that is, the air permeability was suddenly increased. Accordingly, it is apparent that the ether foams are poor in the ozone deterioration. However, in Foam No. 2 produced by compounding the composition for the ether foam with the secondary amine compound, the air permeability was 1.9 times larger than the initial one after 170 hours, 2.6 times larger than the initial one after 280 hours and 4.8 times larger than the initial one after 430 hours. Accordingly, it was revealed that the secondary amine compound had excellent effect in the foam produced using the polyether polyol alone.

According to the present invention, from 1 to 25 parts by weight of a specific secondary amine compound is incorporated into raw materials for sealing foam. As a result, a sealing foam is obtained which combines the excellent resistance to ozone deterioration characteristic of ester foams and the excellent resistance to wet heat aging characteristic of ether foams. In a preferred embodiment of the present invention in which a polyester-polyether polyol is used, a sealing foam having the excellent capacities described above can be obtained without incorporating a polyester polyol or a polyether polyol. Further, according to the present invention, a door for a conditioner excellent in ozone deterioration in particular can be obtained by using the sealing foam excellent in sealing ability as described above.

While the invention has been described in detail and with reference to specific embodiments thereof, it will be apparent to one skilled in the art that various changes and modifications can be made therein without departing from the spirit and scope thereof.

What is claimed is:

1. A polyurethane foam for a sealant obtained by reacting and curing a foamable composition comprising a polyisocyanate ingredient, a polyol ingredient, and an aromatic secondary amine ingredient, the amount of said aromatic secondary amine ingredient being from 3 to 25 parts by weight per 100 parts by weight of said polyol ingredient; wherein at least part of the polyol ingredient in the foamable composition is a polyester-polyether polyol.

2. The polyurethane foam for sealant as claimed in claim 1, wherein at least part of the polyol ingredient in the foamable composition is a polyester-polyether polyol.

3. The polyurethane foam for sealant as claimed in claim 1, wherein the aromatic secondary amine ingredient in the foamable composition comprises at least one aromatic secondary amine compound selected from the group consisting of poly(2,2,4-trimethyl-1,2-dihydroquinoline), 6-ethoxy-1,2-dihydro-2,2,4-trimethylquinoline, octyl-substituted diphenylamines, alkylated diphenylamines, 4,4'-($\alpha,\alpha$-dimethylbenzyl)diphenylamine, and N,N'-diphenyl-p-phenylenediamine, the amount of said at least one aromatic secondary amine compound being from 3 to 12 parts by weight per 100 parts by weight of the polyol ingredient.

4. The polyurethane foam for sealant as claimed in claim 1, wherein the polyol ingredient in the foamable composition is a mixture of a polyester polyol and a polyether polyol, the amount of the polyether polyol being from 70 to 90 parts by weight per 100 parts by weight of the polyol ingredient.

5. The flexible polyurethane foam for sealant as claimed in claim 1, wherein the polyol ingredient in the foamable composition is a mixture of a polyester-polyether polyol and a polyester polyol, the amount of the polyester-polyether polyol being from 40 to 85 parts by weight per 100 parts by weight of the polyol ingredient.

6. The flexible polyurethane foam for sealant as claimed in claim 1, wherein the polyol ingredient in the foamable composition is a mixture of a polyester-polyether polyol and a polyether polyol, the amount of the polyester-polyether polyol being from 20 to 50 parts by weight per 100 parts by weight of the polyol ingredient.

7. The flexible polyurethane foam for sealant as claimed in claim 1, which has an air permeability as measured in accordance with JIS L 1096 of from 5 to 20 cc/cm$^2$/sec after being subjected to 400-hour exposure according to the ozone deterioration test as provided for in JIS K 6301.

8. The flexible polyurethane foam for sealant as claimed in claim 1, wherein at least part of the polyol ingredient in the foamable composition is a polyester-polyether polyol, and the polyurethane foam has an air permeability as measured in accordance with JIS L 1096 of from 5 to 20 cc/cm$^2$/sec after being subjected to 400-hour exposure according to the ozone deterioration test as provided for in JIS K 6301.

9. The flexible polyurethane foam for sealant as claimed in claim 1, which has a retention of tensile strength as measured in accordance with JIS K 6301 of 70% or higher after being subjected to 1,600-hour exposure to an atmosphere having a temperature of 80° C. and a relative humidity of 95%.

10. The flexible polyurethane foam for sealant as claimed in claim 1, wherein at least part of the polyol ingredient in the foamable composition is a polyester-polyether polyol, and the polyurethane foam has a retention of tensile strength as measured in accordance with JIS K 6301 of 70% or higher after being subjected to 1,600-hour exposure to an atmosphere having a temperature of 80° C. and a relative humidity of 95%.

11. A flexible polyurethane foam for a sealant obtained by reacting and curing a foamable composition comprising a polyisocyanate ingredient, a polyol ingredient, and an aromatic secondary amine;

wherein at least part of the polyol ingredient in the foamable composition is a polyester-polyether polyol obtained by adding phthalic acid and propylene glycol in an equimolar amount, the amount of said polyester-polyether polyol being from 26 to 100 weight parts based upon the total amount of the polyol ingredient;

and wherein the aromatic secondary amine ingredient in the foamable composition comprises at least one aromatic secondary amine compound selected from the group consisting of poly(2,2,4-trimethyl-1,2-dihydroquinoline), 6-ethoxy-1,2-dihydro-2,2,4-trimethylquinoline, octyl-substituted diphenylamines, alkylated diphenylamines, 4,4'-($\alpha$-$\alpha$-dimethylbenzyl)diphenylamine, and N,N'-diphenyl-p-phenylenediamine, the amount of said at least one aromatic secondary amine compound being from 3 to 25 parts by weight per 100 parts by weight of the polyol ingredient.

12. A flexible polyurethane foam for sealant obtained by reacting and curing a foamable composition comprising a polyisocyanate ingredient, a polyol ingredient, and an aromatic secondary amine;

wherein the aromatic secondary amine ingredient in the foamable composition comprises at least one aromatic secondary amine compound selected from the group consisting of poly(2,2,4-trimethyl-1,2-dihydroquinoline), 6-ethoxy-1,2-dihydro-2,2,4-trimethylquinoline, octyl-substituted diphenylamines, alkylated diphenylamines, 4,4'-($\alpha$-$\alpha$-dimethylbenzyl)diphenylamine, and N,N'-diphenyl-p-phenylenediamine, the amount of said at least one aromatic secondary amine compound being from 3 to 25 parts by weight per 100 parts by weight of the polyol ingredient;

and wherein the polyol ingredient in the foamable composition is a mixture of a polyester polyol and a polyether polyol, the amount of the polyether polyol being from 70 to 90 parts by weight per 100 parts by weight of the polyol ingredient, the polyether polyol being obtained by addition polymerization of propylene oxide, and the polyester polyol being at least one polyester polyol selected from the group consisting of:

(1) a polyester polyol obtained by condensing a dimer acid and diethylene glycol, (2) a polyester polyol obtained by ring-opening polymerization of caprolactone, (3) a polyester polyol obtained by condensing methylpentane diol and adipic acid, (4) a polyester polyol obtained by ring-opening polymerization of methylvalerolactone.

13. The flexible polyurethane foam for sealant according to claim 12, wherein the polyol ingredient in the foamable composition is a mixture of a polyester-polyether polyol and a polyester polyol, the amount of the polyester-polyether polyol being from 40 to 85 parts by weight per 100 parts by weight of the polyol ingredient.

14. The flexible polyurethane foam for sealant according to claim 12, wherein the polyol ingredient in the foamable composition is a mixture of a polyester-polyether polyol and a polyether polyol, the amount of the polyester-polyether polyol being from 20 to 50 parts by weight per 100 parts by weight of the polyol ingredient.

15. The flexible polyurethane foam for sealant according to claim 12, which has an air permeability as measured in accordance with JIS L 1096 of from 5 to 20 cc/cm$^2$/sec after being subjected to 400-hour exposure according to the ozone deterioration test as provided for in JIS K 6301.

16. The flexible polyurethane foam for sealant according to claim 12, wherein at least part of the polyol ingredient in the foamable composition is a polyester-polyether polyol, and the polyurethane foam has an air permeability as measured in accordance with JIS L 1096 of from 5 to 20 cc/cm$^2$/sec after being subjected to 400-hour exposure according to the ozone deterioration test as provided for in JIS K 6301.

17. The flexible polyurethane foam for sealant according to claim 12, which has a retention of tensile strength as measured in accordance with JIS K 6301 of 70% or higher after being subjected to 1,600-hour exposure to an atmosphere having a temperature of 80° C. and a relative humidity of 95%.

18. The flexible polyurethane foam for sealant according to claim 12, wherein at least part of the polyol ingredient in the foamable composition is a polyester-polyether polyol, and the polyurethane foam has a retention of tensile strength as measured in accordance with JIS K 6301 of 70% or higher after being subjected to 1,600-hour exposure to an atmosphere having a temperature of 80° C. and a relative humidity of 95%.

19. A polyurethane foam for a sealant obtained by reacting and curing a foamable composition comprising a polyisocyanate ingredient, a polyol ingredient and an aromatic secondary amine ingredient, wherein the polyol ingredient is a polyester-polyether polyol and the aromatic secondary amine is an alkylated diphenyl amine, the amount of the alkylated diphenyl amine being 1 to 25 parts by weight.

* * * * *